Sept. 16, 1958   R. W. GIERTZ ET AL   2,851,938
TRACTOR HYDRAULIC POWER LIFT CONTROL
Filed May 28, 1956   2 Sheets-Sheet 1
FIG. 1
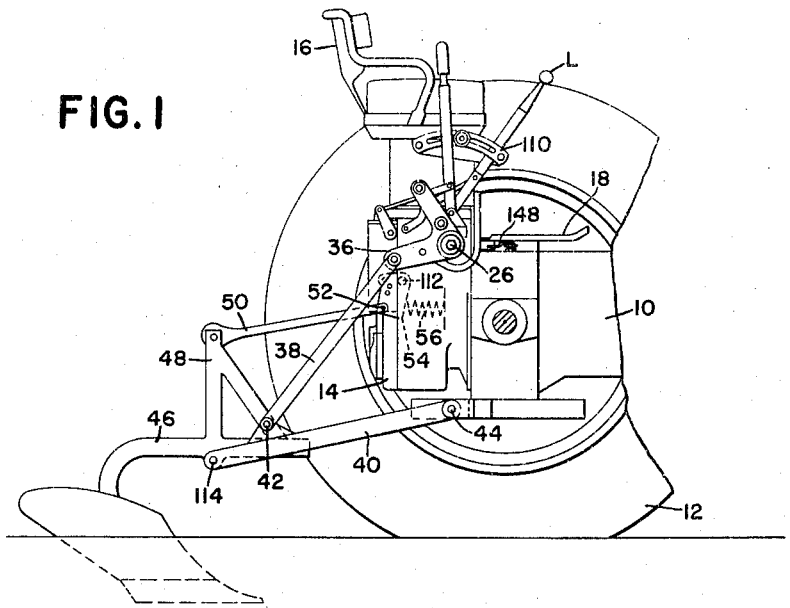
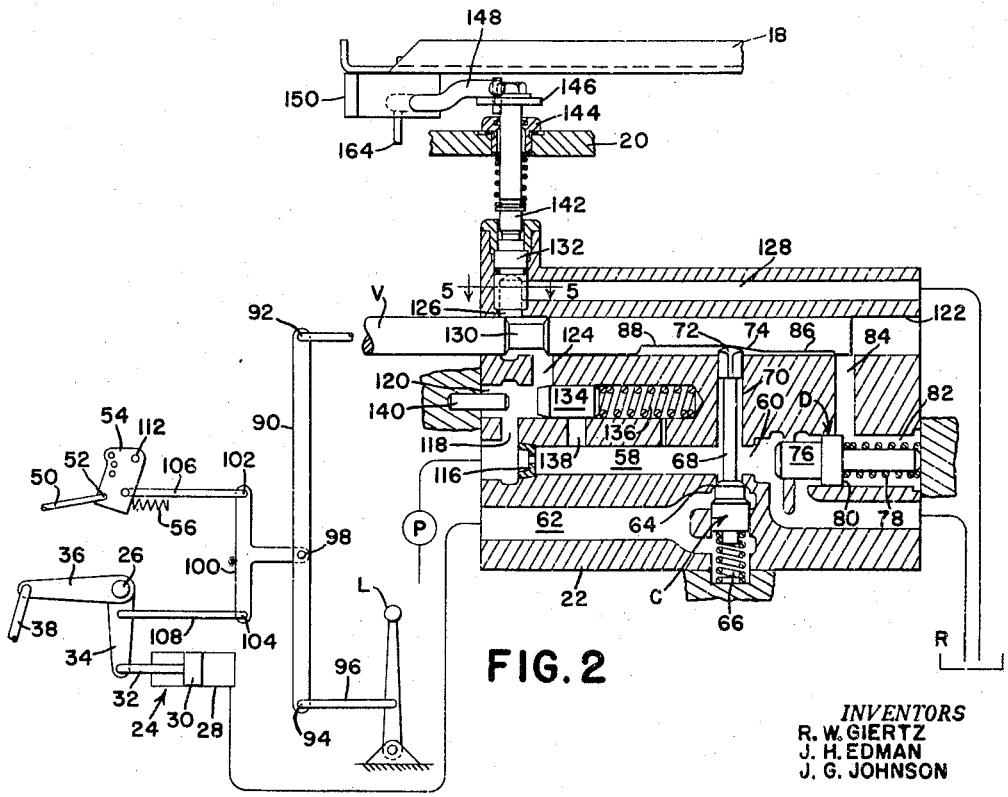
FIG. 2
INVENTORS
R. W. GIERTZ
J. H. EDMAN
J. G. JOHNSON Sept. 16, 1958 R. W. GIERTZ ET AL 2,851,938
TRACTOR HYDRAULIC POWER LIFT CONTROL
Filed May 28, 1956 2 Sheets-Sheet 2

*INVENTORS*
R. W. GIERTZ
J. H. EDMAN
J. G. JOHNSON

United States Patent Office 2,851,938
Patented Sept. 16, 1958

2,851,938

TRACTOR HYDRAULIC POWER LIFT CONTROL

Robert W. Giertz, John H. Edman, and John G. Johnson, Waterloo, Iowa, assignors to Deere Manufacturing Co., Dubuque, Iowa, a corporation of Iowa Application May 28, 1956, Serial No. 587,565

11 Claims. (Cl. 97—46.07)

This invention relates to a tractor hydraulic power lift system and more particularly to the control thereof.

It is a principal object of the invention to provide improved control means for tractor power lift systems of the types forming the subject matter of the U. S. patents to Edman 2,721,508 and Worstell 2,477,710. In each of these cases, as is typical of modern agricultural tractors, the tractor has a built-in hydraulic power lift system including a fluid motor which operates a rockshaft for raising and lowering implements associated with the tractor. The Worstell patent discloses a hydraulic valve arrangment in which a main control valve conditions a differential valve for opening and closing an exhaust port respectively according to neutral and active positions of the main control valve so that, when the main control valve is in its neutral position, the differential valve opens the exhaust port for relatively free circulation of pump pressure and, when the main control valve is moved to an active position, fluid pressure applied to the larger area of the differential valve closes the exhaust ports so that pump pressure is directed to the fluid motor for turning the rockshaft to raise the associated implement. The Edman patent discloses a relation between valve mechanism of the character just described and a draft control system in which the position of the implement is automatically controlled in response to variations in draft load thereon.

Because of the instantaneous closing characteristics of the differential valve, it is found that upward adjustment of the implement is apt to occur in rather large increments, which is undesirable in some operations, particularly when the system embodies draft or load control. The same undesirable characteristics are present to some extent in manual operation of the system. These disadvantages are not extant in lowering adjustment of the implement, since the main control valve is associated with a check valve and the rate of lowering may be regulated. According to the present invention, the control system is improved by a flow control valve which enables regulation of the rate of raising. The invention features the provision of a flow control valve that can be rendered inoperative in conditions where large raising increments are desired. It is a further object of the invention to co-ordinate the flow control aspect with the main control valve so that full raising of the implement can be accomplished when the main control valve is moved to its fully opened position. As a broad proposition, it is the general object of the invention to provide a flow control means which reduces the speed of rockshaft operation, particularly in a raising direction, thus avoiding abrupt changes in upward adjustment of the implement. It is also significant that the reduced flow afforded by the flow control valve reduces the transmission of shock load to the tractor and thus improves the operator's riding comfort.

The foregoing and other important objects and desirable features inherent in and encompassed by the invention will become apparent as a preferred embodiment thereof is disclosed by way of example in the ensuing specification and accompanying sheets of drawings, the several figures of which will be described immediately below.

Fig. 1 is a fragmentary view of the rear portion of a tractor and associated implement.

Fig. 2 is a sectional view, on an enlarged scale, and partly schematic, showing the over-all aspects of the fluid control system.

Figure 3:
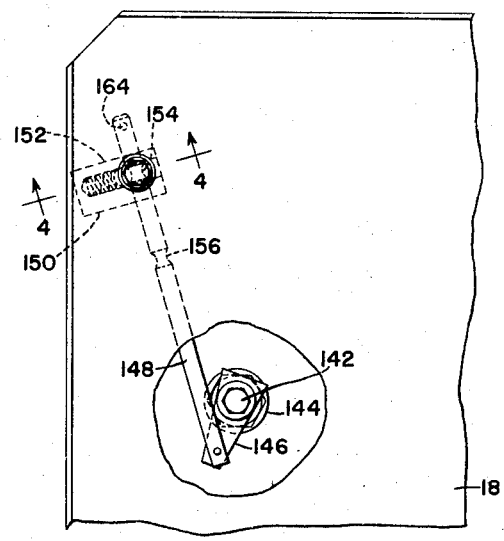
Fig. 3 is a plan view of a portion of the operator's station, with portions broken away, illustrating the actuator means for the flow control valve.

The tractor chosen for purposes of illustration is a typical agricultural tractor having a fore-and-aft main body housing 10 carried on traction wheels, one of which is visible at 12. The rear end of the body includes auxiliary housing structure 14 above which is located an operator's station comprising a seat 16 and a floor or platform 18. The floor 18 is spaced pust above a top wall 20 of the main housing 10 (Fig. 2).

It is typical of the hydraulic power lift system disclosed here, as well as those of similar nature, that the main part of the system is carried at least in part within the main body housing 10, other parts of the system being embodied in the rear housing structure 14. The basic part of the system is disclosed best in Fig. 2 as comprising a valve housing 22, disposed within the main body housing 10 and operative to control a built-in or rockshaft motor 24 for turning or rocking a transverse rockshaft 26. It will be understood that the illustration of the rockshaft 26 in Fig. 2 is schematic and that in a commercial structure the rockshaft is closely associated with the housing structure 14, as is the fluid motor 24. This motor comprises a cylinder 28 and a piston 30, which piston has a piston rod 32 connected interiorly of the housing with an arm 34 rigid on the rockshaft 26. The rockshaft has, exteriorly of the housing structure 14, a pair of lift arms rigidly secured thereto, one of these arms being visible at 36 in Figs. 1 and 2. Each arm is conventionally connected by a lift link 38 to a trailing draft or hitch link 40, the connection being effected at 42 and the draft link being pivotally connected to the tractor at 44.

An implement, represented here by a plow 46, is typically connected to the rear ends of the draft links 40 and has rigid thereon a mast 48 for receiving the rear end of a top link 50, the forward end of which is connected at 52 to a draft control clevis 54 which acts against a draft or load spring 56. The implement-hitch-tractor relationship is broadly conventional and may differ from that illustrated without affecting the invention.

The valve housing 22 has a supply passage or conduit 58, connected at one end to a pump P and connected at its other end to a reservoir R. The passage or conduit is provided intermediate its ends with an exhaust port 60 which is controlled by a differential valve D. When the exhaust port is open, pump pressure is circulated to the reservoir without any effect on a check valve C which controls a motor passage or conduit 62. This conduit is connected to the motor cylinder 28 behind the piston 30. The check valve C controls a motor port 64, upstream of the exhaust port 60, and is normally biased to close the motor port by means of a check valve spring 66.

The check valve has a stem 68, loosely received in a bore 70 transverse to the passage 58, and the terminal end 72 of the stem is under control of a ramp 74 on a main control valve member V. This valve member is shown in its neutral position in Fig. 2 and the check valve C closes the motor port 64. Therefore, fluid flow through the passage 58 is sufficient to open the differential valve D, the fluid acting on the small piston 76 of that valve to move the valve against the bias of a spring 78. The differential valve has a large piston or fluid-receivable area 80 which is exposed to a differential valve chamber 82, which chamber is connected to the supply conduit 58 upstream of the exhaust port 60 by means of a passage or bore 84, a relief 86 on the bottom of the main control valve member V and the check valve stem bore 70, it being understood that the terminal end 72 of the check valve stem is of cloverleaf section. The main control valve member V in its neutral position cuts off the chamber passage 84 so that the large piston 80 of the differential valve D is not exposed to fluid under pressure. Therefore, pressure in the supply passage 58 will open the differential valve as aforesaid so that fluid may circulate freely to the reservoir R.

When the main control valve member V is moved to the left of its neutral position as shown in Fig. 2, the ramp 74 forces the check valve C open and the cylinder 28 may exhaust to the reservoir R via the motor passage 62 and exhaust port 60. When the main control valve member V is moved to the right of its Fig. 2 position, the relief 86, in conjunction with the ramp 74 and a flat 88 on the valve member, establishes communication between the check valve bore 70 and the differential valve chamber 82, whereby fluid under pressure supplied to the large piston 80 forces the differential valve to the left and closes the exhaust port 60. Pressure rise in the supply conduit 58 opens the check valve C so that fluid under pressure from the pump is directed to the motor 24. The arrangement of the motor is such that fluid supplied thereto extends the piston 30 and causes clockwise rocking of the rockshaft 26, which in turn effects raising of the implement connected to the tractor. Exhaust of the motor, as when the main control valve member V is moved to the left of its Fig. 2 position, effects lowering of the implement.

To the extent thus far described, the arrangement is substantially identical to that shown in the above identified Worstell patent, with the exception of the superimposition of the draft control arrangement, which itself forms the subject matter of the above-identified Edman patent. The latter patent discloses also the co-ordinated control of the main control valve member V by follow-up means that interconnects the draft or load responder 54, the rockshaft arm 34, and a control lever L. This arrangement is shown schematically in Fig. 2 as including a beam or lever 90 pivotally connected at one end at 92 to the control valve member V and pivotally connected at its other end at 94 to a link 96 which is in turn connected to the lever L. The beam has fulcrumed intermediate its ends, at 98, a secondary beam 100 which is pivotally connected at its opposite ends respectively at 102 and 104 to links 106 and 108 that are connected respectively to the load responder 54 and the rockshaft arm 34. As shown in Fig. 1, the lever L is appropriately mounted on the tractor and is associated with a quadrant 110 which includes not unconventional means for selectively fixing the position of the lever L at any desired point in an arcuate range commensurate with the length of the quadrant.

The fundamentals of the operation of the system include initial positioning of the valve member V by the lever L and return of the valve member V to neutral when the rockshaft moves in an amount proportional to movement of the lever L. Variations in draft load are reflected by movement of the draft responder 54 about its pivot 112 on the tractor, and the valve member V will be displaced from its neutral position in accordance with the variation in draft load, after which the valve member V will be automatically returned to its neutral position in response to changes in the rockshaft position.

For example, the lever L is shown in its neutral position in Fig. 2 and if this lever is moved forwardly or clockwise, the valve member V will move to the left, to effect lowering of the implement. This follows from the fact that the beam 90 pivots on the fulcrum 98 and moves in a counterclockwise direction. As the implement lowers, the rockshaft 26 turns in a counterclockwise direction and the arm 34 transmits a forward force to the secondary beam 100 via the link 108. The pivot 94 is now the fulcrum of the beam 90 and the forward force from the link 108 is transmitted via 104 and 98 to the beam 90, thus moving the valve V forward to its neutral position. In the event that the draft load increases, the implement 46 will tend to turn clockwise about its pivotal connection 114 with the draft links 40, thereby transmitting a forward force through the top link 50 which acts on the load responder 54 to rock that responder in a counterclockwise direction, following which the forward force transmitted by the link 102 to the beam 100 causes the main beam 90 to move clockwise about the point 94 as a pivot, thus shifting the main control valve member V forwardly and interconnecting the supply conduit 58 and the differential valve chamber 82. Thereupon, the exhaust port 60 is closed by the differential valve D and the pressure rise in the supply conduit 58 opens the check valve C and fluid under pressure is supplied to the motor 24 to turn the rockshaft 26 in a clockwise direction to raise the implement. It is at this point that the significance of the present invention becomes apparent, because, as will be noted, closing of the differential valve D is immediate and instantaneous, substantially without regard to the amount of rightward movement of the valve member, since as soon as communication is established between the supply conduit 58 and the differential valve chamber 82, the differential valve closes and fluid is supplied to the motor at full volume. Accordingly, the raising increments for the implement will be substantially large. As pointed out above, large increments in raising adjustment are undesirable in many conditions. To eliminate these undesirable results, the present invention provides flow control means, to be described immediately below.

It will be readily recognized that the rate of flow to the motor 24 could be permanently diminished by restricting the supply conduit 58 upstream of the motor port 64. This would obviously decrease the rate of raising of the implement without affecting the rate of lowering. However, just as there are conditions in which fast raising is undesirable, there are conditions in which fast raising is not undesirable. Accordingly, a permanent restriction in the supply conduit is not the answer. However, a restriction that can be by-passed by controllable means will satisfactorily produce the desired result and that, broadly, is the aim of the present invention.

Pursuant to the above, the supply conduit 58 is provided with an orifice or restriction 116 at its inlet or pump-proximate end, which places the restriction upstream of the motor port 64. The valve housing 22 is provided with a plurality of bores or passages which together comprise a drain conduit that leads ultimately to the reservoir R. This drain conduit is made up of a first bore 118, transverse to the supply conduit 58 ahead or upstream of the restriction 116, which bore intersects a flow control valve bore 120 that is here shown parallel to the supply bore or passage 58. The main control valve V is axially shiftable in a valve bore 122 and a second transverse bore 124, included in the drain conduit, interconnects the bores 120 and 122. A third bore 126 is offset from the drain bore 124 across the valve bore 122 and leads to a reservoir passage 128. For purposes of the present description, the bore portions 124 and 126 may be considered as the outlet end of the drain conduit 118—124—126, and this outlet end is controlled by a valve portion 130 on the valve member V as well as by an "on-off" valve 132. As will be apparent from Figs. 2 and 5, the valve 132 may interconnect or separate the drain passage portions 126 and 128. For the present, the description will proceed on the basis of the valve 132 occupying its open position (Figs. 2 and 5), in which case fluid not acceptable by the restriction 116 will be diverted to the reservoir via the drain conduit 118—124—126—128, assuming that the main control valve V is in its neutral position as illustrated in Fig. 2.

The valve bore 120 carries a flow control valve 134 which is backed up by a spring 136. The valve 134 controls a relationship between the drain bore portion 118 and a by-pass passage 138 which leads to the supply conduit 58 downstream of the restriction 116; that is to say, a controllable by-pass of the restriction 116 is effected by 118—134—138. When the pump P is not operating, the spring 136 behind the flow control valve 134 moves that valve to the left against a stop 140. Fig. 2 shows the condition of the valve 134 when the pump is operating and the main control valve member V is in its neutral position. Experience has shown that with an arrangement such as that illustrated, desirable results are achieved by halving the speed of the rockshaft in its raising direction. These results are achieved by carefully calculating such factors as oil viscosity, size of the orifice at 116, the load of the flow control valve spring 136 and the cross sectional area of the flow control valve 134. In a system in which the pump output is approximately 10 G. P. M., commendable results are achieved by cutting the orifice flow to 5 G. P. M., in which case the pressure drop through the orifice 116 is approximately 25 p. s. i. These figures are, of course, representative only and could be varied on the basis of variations in the above factors, as well as by variations in pump size, line restrictions etc.

On the basis of the foregoing, and with the main control valve in neutral and the "on-off" valve 132 open, approximately one-half of the pump output is diverted to the reservoir via the drain conduit 118—124—126—128 and the other half flows through the restriction 116 to the reservoir via the supply conduit 58 and the open exhaust port 60. In these circumstances, the flow control valve 134 is backed up to interconnect the drain passage portions 118 and 124 across the bore 120, but the valve 134 keeps the by-pass passage 138 closed. Now, if the control lever L is moved to the left so as to effect raising of the implement via clockwise rotation of the rockshaft 26, the speed of rotation of the rockshaft will depend upon the amount of movement of the valve member V, because of the control effect of the valve portion 130 on the drain conduit portions 124—126. Hence, if the valve V is moved to the right in but a small amount, the valve portion 130 will have little effect on the flow from 124 to 126 and the halving of flow will continue as before, with the exception that, of course, the differential valve D closes and the reduced rate of flow passes the open check valve C to slowly extend the motor 30. It is in association with the draft or load control that the small increments in raising are of extreme importance. Hence, small increases in draft load will be reflected by small forward movement of the draft responder 54 which in turn will cause relatively small movements of the main control valve member V. As long as a portion of the pump output is delivered into the reservoir via the drain conduit, the rate of extension of the motor 30 will be reduced and accordingly the speed of clockwise rotation of the rockshaft 26 will be reduced.

It is a feature of the invention that the drain conduit is automatically cut-off by maximum movement of the valve member V to the right, which would occur primarily when the operator deliberately moves the lever L to its maximum rearward position, as at the end of a row, in which case maximum speed of the rockshaft is desired. The automatic cut-off is effected because the valve portion 130, upon maximum rightward movement of the valve member V, moves completely past the drain bore portion 124 and cuts off this portion, whereby pressure rise at 118—120 fully opens the flow control valve 134 so that flow not accepted by the restriction 116 now by-passes the restriction via 118—134—138. It will be readily seen that proper calculation of the valve portion 130 will vary the time and amount of opening of the by-pass 138.

Figure 5:
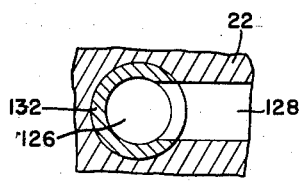
Fig. 5 is an enlarged section on the line 5—5 of Fig. 2.

In the operation of the tractor and implement in conditions in which fast raising is desired at all times, the "on-off" valve 132 may be turned to its "off" position, approximately 90° from its "open" position as shown in Fig. 5, which will disconnect the drain conduit portions 126 and 128 and the by-pass 118—134 will always be effective so that the supply conduit 58 downstream of the restriction 116 carries full pump output.

Figure 4:
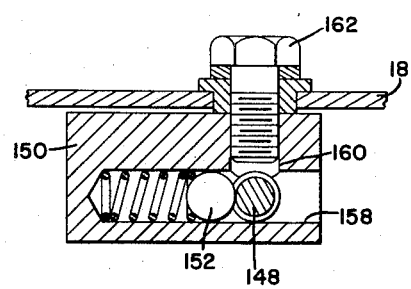
Fig. 4 is an enlarged section on the line 4—4 of Fig. 3.

The "on-off" valve 132 is preferably cylindrical and has integrally coaxial therewith a shaft or operating element 142 that projects upwardly through an appropriate aperture, sealed at 144, in the top wall 20 of the main body housing 10. The upper end of the shaft or element 142 terminates just below the floor 18 and has rigidly secured thereto an arm 146 which is connected to one end of an actuator or rod 148. This actuator extends laterally to one corner of the floor or platform 18 (Fig. 3) and is slidably carried in a support block 150 which houses releasable means in the form of a detent 152. The rod 148 has therein a pair of notches 154 and 156, either of which may be engaged by the detent 152, depending upon the position of the rod. As best shown in Fig. 4, the detent 152 is carried in a bore 158 which is intersected by the rod 148, by means of which the detent 152 is prevented from escaping the bore. An upright tapped bore 160 intersects the bore in which the rod 148 is carried and a cap screw 162 is passed through the floor 18 and into the tapped bore 160 to secure the support block 150 in place. A transverse pin 164 at the terminal end of the rod 148 provides a convenient handle.

It is a feature of the invention that hydraulic power lift systems of the general character referred to may be readily modified to incorporate the flow control means of the present invention. Further features and objects of the invention have already been outlined. Still others will readily occur to those versed in the art, as will many modifications and alterations in the preferred embodiment of the invention disclosed herein, all of which may be achieved without departure from the spirit and scope of the invention.

What is claimed is:

1. In a tractor having an implement hitch and a hydraulic control system for effecting raising and lowering of the hitch and including a fluid motor connected to the hitch, a load responder displaceable in proportion to draft load on the hitch, a pump, a reservoir and a motor-controlling valve, the improvement residing in the valve, which comprises: a pump-connected supply conduit having a motor port and an exhaust port connected respectively to the motor and the reservoir; control valve means having a neutral position incurring closing of the motor port and opening of the exhaust port and shiftable progressively through an active range to incur full opening of the motor port and closing of the exhaust port; means interconnecting the control valve means and the aforesaid load responder for movement of the former by the latter; a drain conduit connected to the supply conduit upstream of the motor port and having an outlet leading to the reservoir; restriction means in the supply conduit intermediate the motor port and the drain conduit for diverting part of the pump output to said drain conduit; a by-pass conduit interconnecting the drain and supply conduits and by-passing the restriction means; a flow control valve biased to close the by-pass conduit and openable in response to pressure rise in the drain conduit for by-passing the restriction means; and regulating valve means connected to and movable with the control valve means for regulating the drain conduit outlet, said regulating valve means being operative in the neutral position of the control valve means to open said outlet and operative to progressively close said outlet as said control valve means moves progressively through its active range.

2. The invention defined in claim 1, including: a settable "on-off" valve independent of the control valve means for selectively closing and opening the drain conduit outlet.

3. The invention defined in claim 1, including: a valve housing having passages respectively affording the drain, supply and by-pass conduits and including a valve bore intersected by said drain conduit outlet and carrying a part of said control valve means, and said regulating valve means comprising a valve portion on the control valve means part and disposed in said bore.

4. The invention defined in claim 1, in which: the control valve means includes a chamber connected to the supply conduit upstream of the exhaust port, a differential valve for opening and closing the exhaust port and having a small piston exposed to the supply conduit and a large piston exposed to the chamber, and the control valve means has a valve portion operative in the neutral position of said control valve means to disconnect the chamber from the uspply conduit so that pressure in said supply conduit acts on the small piston to open the exhaust port and said control valve means valve portion being operative as soon as said control valve means enters its active range to connect the supply conduit to the chamber so that pressure rise in the chamber acts on said larger piston to close said exhaust port.

5. In a tractor hydraulic system including a movable work member, a fluid motor for adjusting the work member, a pump, a reservoir, a motor-controlling valve, and a control element movable to control the valve, the improvement residing in the valve, which comprises: a pump-connected supply conduit having a motor port and an exhaust port connected respectively to the motor and the reservoir; control valve means having a neutral position incurring closing of the motor port and opening of the exhaust port and shiftable progressively through an active range to incur full opening of the motor port and closing of the exhaust port; means interconnecting the control valve means and the aforesaid control element for movement of the former by the latter; a drain conduit connected to the supply conduit upstream of the motor port and having an outlet leading to the reservoir; restriction means in the supply conduit intermediate the motor port and the drain conduit for diverting part of the pump output to said drain conduit; a by-pass conduit interconnecting the drain and supply conduits and by-passing the restriction means; a flow control valve biased to close the by-pass conduit and openable in response to pressure rise in the drain conduit for by-passing the restriction means; and regulating valve means connected to and movable with the control valve means for regulating the drain conduit outlet, said regulating valve means being operative in the neutral position of the control valve means to open said outlet and operative to progressively close said outlet as said control valve means moves progressively through its active range.

6. The invention defined in claim 5, including: a settable "on-off" valve independent of the control valve means for selectively closing and opening the drain conduit outlet.

7. The invention defined in claim 5, including: a valve housing having passages respectively affording the drain, supply and by-pass conduits and including a valve bore intersected by said drain conduit outlet and carrying a part of said control valve means, and said regulating valve means comprising a valve portion on the control valve means part and disposed in said bore.

8. The invention defined in claim 5, in which: the control valve means includes a chamber connected to the supply conduit upstream of the exhaust port, a differential valve for opening and closing the exhaust port and having a small piston exposed to the supply conduit and a large piston exposed to the chamber, and the control valve means has a valve portion operative in the neutral position of said member to disconnect the chamber from the supply conduit so that pressure in said supply conduit acts on the small piston to open the exhaust port and said control valve means valve portion being operative as soon as said control valve means enters its active range to connect the supply conduit to the chamber so that pressure rise in the chamber acts on said larger piston to close said exhaust port.

9. In a tractor hydraulic system including a movable member, a fluid motor for adjusting the member, a pump, a reservoir and a motor-controlling valve, the improvement residing in the valve which comprises: a pump-connected supply conduit having a motor port and an exhaust port connected respectively to the motor and reservoir; control valve means having a neutral position incurring closing of the motor port and opening of the exhaust port and shiftable through an active range to incur opening of the motor port and closing of the exhaust port; a drain conduit connected to the supply conduit upstream of the motor port and having an outlet leading to the reservoir; restriction means in the supply conduit intermediate the motor port and the drain conduit for diverting part of the pump output to said drain conduit; a by-pass conduit interconnecting the drain and supply conduits and by-passing the restriction means; a flow control valve biased to close the by-pass conduit and openable in response to pressure rise in the drain conduit for by-passing the restriction means; and regulating valve means connected to and movable with the control valve means for regulating the drain conduit outlet, said regulating valve means being operative in the neutral position of the control valve means to open said outlet and operative to progressively close said outlet as said control valve means moves through its active range.

10. The invention defined in claim 9, including: a settable "on-off" valve independent of the control valve means for selectively closing and opening the drain conduit outlet.

11. The invention defined in claim 9 including: a valve housing having passages respectively affording the drain, supply and by-pass conduits and including a valve bore intersected by said drain conduit outlet and carrying a part of said control valve means, and said regulating valve means comprising a valve portion on the control valve means part and disposed in said bore.

References Cited in the file of this patent

UNITED STATES PATENTS

| 2,590,011 | Hawkins | Mar. 18, 1952 |
| 2,658,438 | Seng | Nov. 10, 1953 |
| 2,675,751 | Weber | Apr. 20, 1954 |
| 2,722,873 | Garmager | Nov. 8, 1955 |